Figures 1, 2:
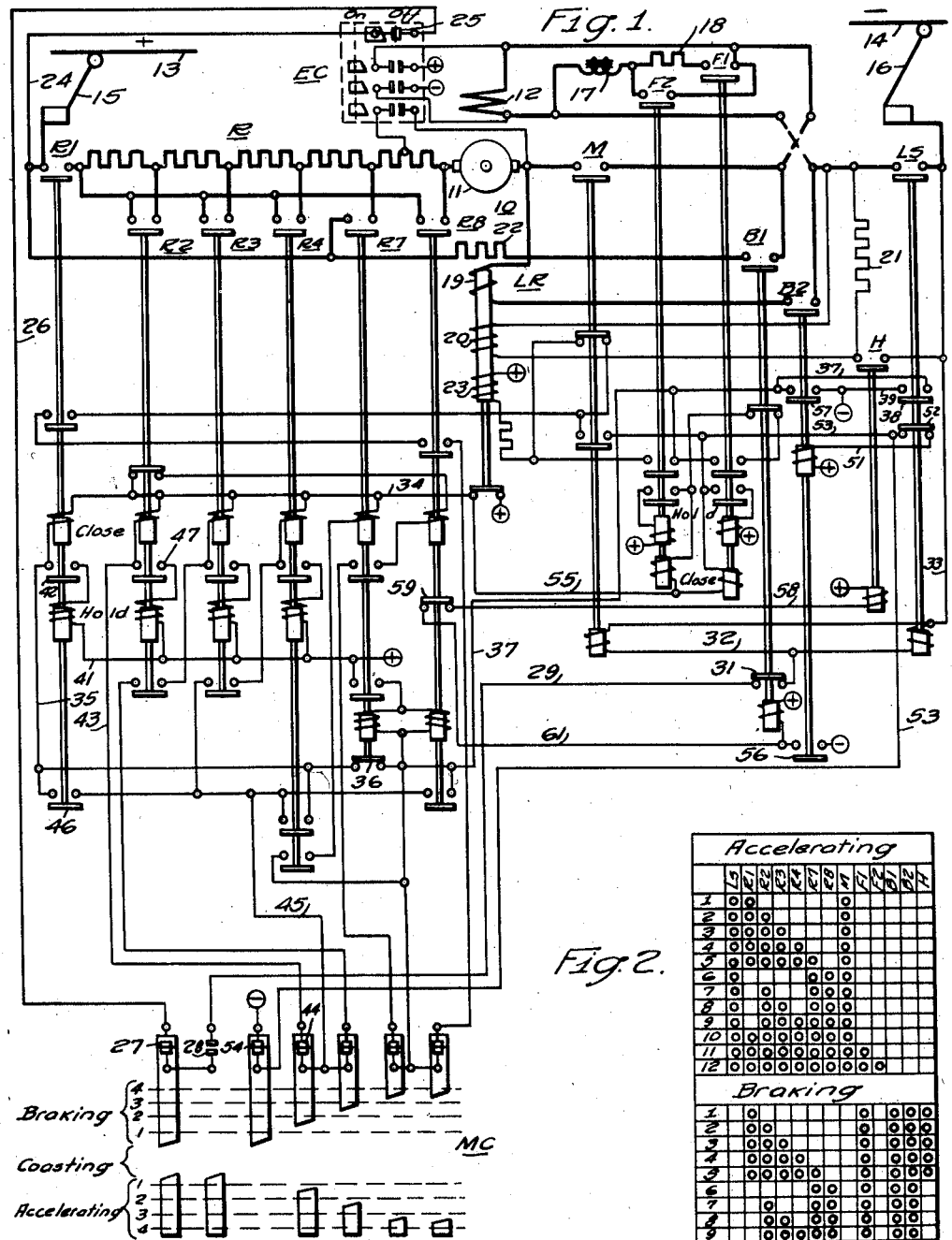

April 7, 1942. B. O. AUSTIN 2,278,608

MOTOR CONTROL SYSTEM

Filed July 26, 1940

WITNESSES:

INVENTOR

Bascum O. Austin.

BY

ATTORNEY

Patented Apr. 7, 1942

2,278,608

UNITED STATES PATENT OFFICE 2,278,608

MOTOR CONTROL SYSTEM

Bascum O. Austin, Forest Hills, Pa., assignor to Westinghouse Electric & Manufacturing Company, East Pittsburgh, Pa., a corporation of Pennsylvania Application July 26, 1940, Serial No. 347,688

7 Claims. (Cl. 172—179)

My invention relates, generally, to motor control systems, and, more particularly, to systems for controlling dynamic and emergency electric braking of electric vehicles such as trolley coaches or buses.

On previously known control equipments for trolley coaches provided with dynamic braking the control apparatus is operated by power received from the trolley conductors through the current collecting devices. Thus, if one of the current collectors leaves the trolley the electric braking equipment does not function. Such a condition may result in serious accidents, particularly in cities which are located in a hilly country where the trolley buses are required to operate over severe grades.

An object of my invention is to provide for operating the dynamic braking equipment of an electric vehicle independently of the line voltage.

Another object of my invention is to provide emergency electric braking for an electrically driven vehicle.

A further object of my invention is to accelerate the action of a current limit relay in a motor control system when dynamic braking is applied at high speeds.

A more general object of my invention is to provide a simplified and improved system for controlling the electric braking of a vehicle.

Other objects of my invention will be explained fully hereinafter or will be apparent to those skilled in the art.

In accordance with my invention, the apparatus for controlling dynamic braking of a vehicle is operated by current obtained from a battery or other auxiliary power source. Thus, dynamic braking may be applied independently of the line voltage. As a further protection, an emergency electric brake is provided which is independent of all other control apparatus, the mechanical or fluid brakes, or the direction of motion of the vehicle. A current limit relay is provided with a coil which is so energized when the dynamic braking connections are established that the operation of the relay is accelerated while the vehicle is traveling at high speeds, thereby avoiding overbraking and overvoltage on the commutator of the motor at high speeds.

For a fuller understanding of the nature and objects of my invention, reference may be had to the following detailed description, taken in conjunction with the accompanying drawing, in which:

Figure 1 is a diagrammatic view of a control system embodying the principal features of my invention; and Fig. 2 is a chart showing the sequence of operation of a portion of the equipment illustrated in Fig. 1.

Referring to the drawing, the system shown therein comprises a motor 10 having an armature winding 11 and a series field winding 12; a line switch LS and a switch M for connecting the motor to power conductors 13 and 14, thereby supplying power to the motor through current collectors 15 and 16, respectively; a pair of switches B1 and B2 for establishing dynamic braking connections for the motor, and a switch H for connecting the field winding 12 across the power conductors 13 and 14 during a portion of the dynamic braking cycle to insure that the dynamic braking action of the motor builds up quickly.

In order to control the motor current during the accelerating and dynamic braking periods, a resistor R is provided which is shunted from the motor circuit in a step-by-step manner by means of resistor shunting switches R1, R2, R3, R4, R7, and R8, which are actuated in sequential relation, as shown in the sequence chart in Fig. 2 during both the accelerating and braking cycles. A pair of field shunting switches F1 and F2 are provided for shunting the field winding 12 through a reactor 17 and a resistor 18 in order to secure maximum speed of the motor 10 in a manner well known in the art.

In order that the sequence of operation of the resistor shunting switches and the field shunting switches may be controlled by interlock progression with a relatively few number of interlocks on these switches, each switch is provided with a closing coil and a holding coil. The closing coil is energized to close the switch, after which the holding coil is energized to retain the switch in the closed position, it being unnecessary to maintain the closing coil energized after the holding coil becomes energized.

In accordance with the usual practice, the progression of the resistor shunting switches both during acceleration and dynamic braking is automatically controlled by a current limit relay LR, thereby preventing an excessive amount of current flowing through the motor winding. The relay LR is provided with the usual series coil winding 19 which is connected in the armature circuit for the motor 10.

The relay LR is also provided with a winding 20 which is connected in parallel-circuit relation with a resistor 21 that is connected in the field winding circuit by the switch H to flash the motor field when the dynamic braking connections are first established. The resistor 21 and the shunt coil 20 are in series-circuit relation with a permanent braking resistor 22, when the switches H and B1 are closed. When the dynamic braking is applied, the voltage across the shunt coil 20 on the limit relay is normally about equal to the line voltage. In this manner, the limit relay is magnetically energized almost to the point of operation. As the braking current builds up, the relay will operate quickly and at the proper time. The operation of the relay arrests the progression of the resistor shunting switches, thereby avoiding over-braking and over-voltage on the commutator at high speeds. As the braking increases, the voltage on the coil 20 is reduced by the amount of the voltage drop across the permanent braking resistor 22. The braking current then reaches its normal value and is definitely under the control of the limit relay with its normal setting. It will be understood that the foregoing action takes place in a relatively short period of time during the initial part of the dynamic braking cycle.

In addition to the windings 19 and 20, the relay LR is also provided with a shunt winding 23 which is energized when the control has completed its sequence of operation either during the accelerating or braking cycles. The excitation of the shunt coil 23 causes the limit relay to be held in the open position. The holding of the limit relay in the open position disconnects all the closing coils of the resistor shunting switches and the field shunting switches from the battery which supplies the current for operating the control equipment. Thus, only the holding coils remain energized after the control sequence is completed. As fully explained in my copending application Serial No. 347,687, filed July 26, 1940, the energization of the coil 23 is controlled by interlocks provided on the resistor shunting switches and the field shunting switch F2. In this manner, the temperature of the closing coils is materially reduced, since they are no longer continuously energized, and, furthermore, a saving in the energy required to operate the control equipment is effected. The operation of the foregoing feature of the present system is similar to that described and claimed in the foregoing copending application with the exception that the energy for operating the control equipment is supplied by a battery instead of through the trolley conductors 13 and 14.

As described and claimed in my foregoing copending application, dynamic braking, coasting, and accelerating or application of power to the vehicle are all controlled by one controller MC which may be of the cam type and pedal operated, if desired. As shown, the controller MC is so constructed that one portion of the controller is utilized for dynamic braking, other portions for coasting, and still another portion for accelerating. When the controller is actuated from its normal position, it passes through the braking positions, the coasting position, and then through the accelerating positions, the maximum speed of the vehicle being obtained by actuating the controller to the full power position, at which time the switches F1 and F2 are closed to shunt the field winding of the motor.

Beginning at the full power position, the first initial motion of the controller in the backward direction removes one step of the field shunting circuit. Further movement towards the coasting position removes the other step of field shunting and begins to insert resistance in series with the motor, thereby softening the shut off of power. Passing through the coasting position, at which time the motor is disconnected from the power conductors, the first braking point is then obtained. Continued motion toward the normal position brings in additional points of braking by closing the resistor shunting switches to shunt the resistor R from the armature circuit. Thus, it will be seen that the normal operation of the vehicle may be controlled by one pedal and that maximum speed is obtained when the pedal is fully depressed and maximum service braking is obtained by completely releasing the pedal.

With a view to protecting the operation of the service dynamic braking against failure of the line voltage, as by the removal of a current collector from a trolley conductor or other causes, the switches for establishing the normal braking connections, the resistor shunting switches and the field shunting switches are all operated from a battery of other auxiliary power source indicated by the positive and negative signs, instead of by the line voltage. In this manner, dynamic braking may be obtained independently of the line voltage.

In order to still further protect the operation of the vehicle against failure of the control equipment, a manually operated emergency controller EC is provided. As shown, the controller EC may be of the cam type and provides an emergency electric brake for the motor 10 which is effective for either direction of motion of the vehicle and requires only a single movement of the operating handle at the operator's platform. When the normally open contact members of the controller EC are closed, the battery is connected directly across the field winding 12 of the motor, thereby separately exciting the motor field. The armature of the motor is connected across a portion of the resistor R, thereby providing a load for the motor which is operating as a separately excited generator.

In this manner, a braking action results which is independent of all other control apparatus, as well as the mechanical or fluid brakes and functions for either direction of motion of the vehicle. With failure of the normal dynamic service brake or the fluid brakes, the operator can still control the speed of the vehicle with this emergency brake. Normally closed contact members on the controller EC are opened when the controller is actuated to the "on" position to interrupt the control circuit for the switches LS and M, thereby insuring that the motor is disconnected from the line in case the emergency brake is applied.

In order that the functioning of the foregoing equipment may be more clearly understood, the operation of the system will now be described in more detail. Assuming that it is desired to accelerate the vehicle at the maximum rate, the controller MC is actuated to its last or full power position. Since it is assumed that the vehicle is started from standstill, nothing happens as the controller is moved through the braking and the coasting positions.

When the first accelerating position is reached, the switches LS, R1, and M are closed to connect the motor across the power conductors 13 and 14 in series with the resistor R. The energizing circuit for the actuating coil of the switch LS may be traced from the positive trolley conductor 13 through the current collector 15, conductor 24, contact members 25 on the controller EC, conductor 26, contact members 27 and 28 on the controller MC, conductor 29, an interlock 31 on the switch B1, conductor 32, the actuating coil of the switch LS, conductor 33, and the current collector 17 to the negative conductor 14. The energizing circuit for the actuating coil of the switch M extends from the conductor 32 through the coil to the negative conductor 33.

Following the closing of the switch LS the closing coil of the switch R1 is energized through a circuit which may be traced from the positive terminal of the control battery (not shown) through the contact members of the relay LR, conductor 34, the closing coil of the switch R1, conductor 35, an interlock 36 on the switch R7, conductor 37, an interlock 38 on the switch LS and conductor 39 to the negative terminal of the battery. Following the closing of the switch R1, its holding coil is energized through a circuit which extends from positive through conductor 41, the holding coil, an interlock 42, and thence to negative through a circuit previously traced.

When the controller reaches the second accelerating position, the switch R2 closes to shunt one step of the resistor R from the motor circuit. The energizing circuit for the switch R2 may be traced from positive through the contact members of the relay LR, conductor 34, the closing coil of the switch R2, conductor 43, contact members 44 of the controller MC, conductor 45, an interlock 46 on a switch R1 to conductor 35 and thence to negative through the circuit previously traced. The holding coil of the switch R2 is energized through an interlock 47 on the switch when the switch is actuated to the closed position.

Following the closing of the switch R2, the switches R3, R4, R7, and R8 are closed by interlock progression in a manner well known in the art. As shown in the sequence chart, the switches R1, R2, R3, and R4 are opened upon the closing of the switch R7. Thus, the resistor R is connected in the motor circuit in two parallel paths, and the switches R2, R3, R4, and R1 are reclosed in the order shown in the sequence chart to shunt the resistor R completely from the motor circuit. Since the operation of the resistor shunting switches by interlock progression under the control of the relay LR is well known in the railway control art, it is believed to be unnecessary to trace all of the control circuits for these switches in detail.

As explained hereinbefore, the field shunting switch F2 is closed at the end of the accelerating cycle to shunt the field winding 12 through the reactor 17. As described in my aforementioned copending application, the coil 23 of the relay LR is energized at the end of the accelerating cycle to open the contact members of the limit relay, thereby deenergizing the closing coils of the resistor shunting switches and the field shunting switches. In this manner, the closing coils are deenergized to prevent overheating of these coils and to effect a saving of the control current drawn from the battery, as is fully explained in the aforementioned copending application.

If it is desired to decelerate the vehicle by means of the service dynamic brake, the controller MC is returned towards its normal position, the maximum braking rate being obtained when the controller is fully returned to the normal position. It will be understood that the motor is disconnected from the power source when the controller passes through the coasting position since all of the control equipment is deenergized at that time. When the controller reaches the first braking position, the switches R1, B1, B2, H, and F1 are closed.

The switches R1, B1, and B2 establish a dynamic braking circuit for the armature of the motor through the resistor R and the switch H, in conjunction with the switch B1, connects the field winding 12 of the motor across the power conductors to excite the field winding, thereby causing a rapid build-up of the motor current to insure a quick braking effect. The switch F1 is closed during the braking cycle to shunt the field winding 12 through the reactor 17 and the resistor 18 to help reduce the braking current generated by the motor, which is normally considerably above the motoring current. The energizing circuit for the switch B2 may be traced from positive through the actuating coil of the switch, conductor 51, an interlock 52 on the switch LS, conductor 53, and contact members 54 on the controller MC to negative. The energizing circuit for the switch F1 extends from the conductor 53 through the closing coil of the switch to conductor 55 and the contact members of the relay LR to positive.

Following the closing of the switch B2, the switches B1, R1, and H are closed. The circuit for the actuating coil of the switch B1 may be traced from positive through the coil and the interlock 56 on the switch B2 to negative. The energizing circuit for the switch R1 may be traced from positive through the contact members of the relay LR, conductor 34, the closing coil of the switch R1, conductor 35, an interlock 36 on the switch R7, conductor 37, an interlock 57 on the switch B2, and conductor 39 to negative. The energizing circuit for the switch H extends from positive through the actuating coil of the switch, conductor 58, an interlock 59 on the switch R8, conductor 61, and the interlock 56 on the switch B2 to negative.

As explained hereinbefore, the closing of the switch H connects the winding 20 on the relay LR in the field flashing circuit for the field winding of the motor 10. In this manner the limit relay is energized almost to the operating point, thereby causing the relay to operate quicker as the braking current builds up in the armature winding of the motor. The operation of the relay LR stops the progression of the control to avoid over-braking and over-voltage on the commutator of the motor while it is rotating at high speeds. As the braking increases, the voltage on the coil 20 is reduced by the voltage drop across the resistor 22, which is connected in the motor circuit at this time, thereby decreasing the effect of the coil 20 and permitting the relay to operate in its normal manner.

The resistor shunting switches R2, R3, R4, R7, and R8 are closed in the order shown in the sequence chart to shunt the resistor R from the motor circuit in the same manner as during the acceleration of the vehicle. The operation of the switches is automatically controlled by the current limit relay LR in a manner well known in the art. Since the current for operating the switches is obtained from the battery, the braking equipment functions independently of the line voltage.

It will be noted that the switch H is deenergized upon the closing of the switch R8, thereby disconnecting the field winding 12 from the power conductors. However, since the field winding is connected in the armature circuit, it is excited by the armature current thereby continuing the braking action of the motor until the vehicle has decelerated to a speed at which the dynamic braking fades out.

As described in my aforementioned copending application, the coil 23 of the limit relay R is energized at the end of the braking sequence, that is, when the operation of the resistor shunting switches is completed. In this manner, the relay LR is actuated to its raised position to deenergize the closing coils of the resistor shunting switches, after they have completed their sequence of operation during dynamic braking, in the same manner as during acceleration.

If it becomes necessary to stop the vehicle by means of the emergency electric brake, the controller EC is thrown to the "on" position, thereby connecting the field winding 12 across the battery to excite the field and connecting the armature winding 11 across a portion of the resistor R to provide a load for the armature. In this manner, the motor 10 is caused to operate as a separately excited generator and produces a braking effect regardless of the direction of motion of the vehicle. Since this braking action is obtained independently of all the other control equipment, it provides a means of holding the vehicle at all times, regardless of the failure of the rest of the equipment on the vehicle.

From the foregoing description, it is apparent that I have reduced the chances of failure of the service dynamic braking equipment on a vehicle by providing for normally operating the equipment from a battery instead of from the line voltage. By providing an emergency braking equipment which operates entirely independently of all the other control equipment on the vehicle, control of the vehicle speed at all times is assured. Furthermore, the operation of the service braking equipment is improved by accelerating the operation of the limit relay during the initial part of the dynamic braking cycle.

I do not desire to be restricted to the particular form or arrangement of parts herein shown and described since it is evident that they may be changed and modified without departing from the spirit and scope of my invention, as defined in the appended claims.

I claim as my invention:

1. In a motor control system, the combination with a motor and a source of power therefor, of switching means for connecting the motor to the power source, additional switching means for establishing dynamic braking connections for the motor, a resistor for controlling the motor current, switches for shunting the resistor during acceleration and dynamic braking of the vehicle, a master controller for controlling the operation of said switching means, an auxiliary power source for energizing the actuating coils of said resistor shunting switches and said switching means for establishing dynamic braking connections, the actuating coils of the switching means for connecting the motor to the power source being energized from said power source through said controller, an emergency controller for establishing electric braking connections for the motor independently of the master controller and interlocking means on the emergency controller for deenergizing the master controller.

2. In a motor control system, the combination with a motor and a source of power therefor, of switching means for connecting the motor to the power source, additional switching means for establishing dynamic braking connections for the motor, a resistor for controlling the motor current, switches for shunting the resistor during acceleration and dynamic braking of the vehicle, a master controller for controlling the operation of said switching means, and an emergency controller for establishing electric braking connections for the motor independently of the master controller and said switching means.

3. In a motor control system, the combination with a motor and a source of power therefor, of switching means for connecting the motor to the power source, additional switching means for establishing dynamic braking connections for the motor, a resistor for controlling the motor current, switches for shunting the resistor during acceleration and dynamic braking of the vehicle, a master controller for controlling the operation of said switching means, an auxiliary source of power, and an emergency controller for establishing electric braking connections for the motor independently of the master controller and said switching means, said emergency controller connecting the field winding of the motor to said auxiliary source of power.

4. In a motor control system, the combination with a motor and a source of power therefor, of switching means for connecting the motor to the power source, additional switching means for establishing dynamic braking connections for the motor, a resistor for controlling the motor current, switches for shunting the resistor during acceleration and dynamic braking of the vehicle, a master controller for controlling the operation of said switching means, an additional source of power, and an emergency controller for establishing electric braking connections for the motor independently of the master controller and said switching means, said emergency controller connecting the field winding of the motor to said additional source of power, and means on said emergency controller for deenergizing the actuating coils of said switching means.

5. In a motor control system, the combination with a motor and a source of power therefor, of switching means for connecting the motor to the power source, additional switching means for establishing dynamic braking connections for the motor, a resistor for controlling the motor current, switches for shunting the resistor, a controller for controlling the operation of said switching means, relay means for controlling the operation of the resistor shunting switches, and means on said relay means for accelerating its operation during a part of the braking cycle.

6. In a motor control system, the combination with a motor and a source of power therefor, of switching means for connecting the motor to the power source, additional switching means for establishing dynamic braking connections for the motor, a resistor for controlling the motor current, switches for shunting the resistor, a controller for controlling the operation of said switching means, relay means for controlling the operation of the resistor shunting switches, means on said relay means for accelerating its operation during a part of the braking cycle, and means associated with said switching means for establishing dynamic braking connections for controlling the energization of said last-named means.

7. In a motor control system, in combination, a motor, a power conductor, switching means for connecting the motor to the power conductor, additional switching means for establishing dynamic braking connections for the motor, a resistor for controlling the motor current, switches for shunting the resistor, relay means for controlling the operation of the resistor shunting switches, a switch for connecting the motor field winding to the power conductor when dynamic braking connections are established, and means on said relay means for accelerating its operation during a part of the braking cycle, the energization of said means being controlled by said switch.

BASCUM O. AUSTIN.